United States Patent
Ki

(10) Patent No.: US 9,212,603 B2
(45) Date of Patent: Dec. 15, 2015

(54) SEPARATE-TYPE ROTARY ENGINE

(76) Inventor: Dockjong Ki, Daejon (KR)

(*) Notice: Subject to any disclaimer, the term of this patent is extended or adjusted under 35 U.S.C. 154(b) by 130 days.

(21) Appl. No.: 13/264,157

(22) PCT Filed: May 1, 2010

(86) PCT No.: PCT/KR2010/002782
§ 371 (c)(1),
(2), (4) Date: Oct. 12, 2011

(87) PCT Pub. No.: WO2010/128776
PCT Pub. Date: Nov. 11, 2010

(65) Prior Publication Data
US 2012/0031369 A1    Feb. 9, 2012

(30) Foreign Application Priority Data
May 6, 2009  (KR) .................. 10-2009-0039073

(51) Int. Cl.
| | |
|---|---|
| *F02B 53/08* | (2006.01) |
| *F02N 9/00* | (2006.01) |
| *F02B 53/14* | (2006.01) |
| *F01C 1/46* | (2006.01) |
| *F01C 11/00* | (2006.01) |

(52) U.S. Cl.
CPC . *F02B 53/14* (2013.01); *F01C 1/46* (2013.01); *F01C 11/004* (2013.01); *F02B 53/08* (2013.01); *Y02T 10/17* (2013.01)

(58) Field of Classification Search
USPC ............ 60/627; 123/198, 204, 213, 215, 221, 123/198 B, 234; 1/198, 204, 213, 215, 221, 1/234
See application file for complete search history.

(56) References Cited

U.S. PATENT DOCUMENTS

| | | | | |
|---|---|---|---|---|
| 2,997,848 | A * | 8/1961 | Snyder .......................... | 123/228 |
| 3,811,804 | A * | 5/1974 | Roth et al. ...................... | 418/32 |
| 4,138,848 | A * | 2/1979 | Bates .............................. | 60/519 |
| 4,393,828 | A * | 7/1983 | Jolly .............................. | 123/203 |
| 4,519,206 | A * | 5/1985 | van Michaels ............... | 60/39.54 |
| 4,741,164 | A   | 5/1988 | Slaughter | |

(Continued)

FOREIGN PATENT DOCUMENTS

| | | |
|---|---|---|
| DE | 4432688 | 3/1995 |
| FR | 1153857 | 3/1958 |

(Continued)

OTHER PUBLICATIONS

International Search Report for PCT/KR2010/002782 Mailed on Jan. 14, 2011.

*Primary Examiner* — Thai Ba Trieu
*Assistant Examiner* — Shafiq Mian
(74) *Attorney, Agent, or Firm* — Revolution IP, PLLC

(57) ABSTRACT

A rotary engine includes a compressor having a first rotor, a first hinged vane, an air intake port and an air outlet and an expander having two-way check valve, a second rotor, a second hinged vane, a one-way check valve, a compressed air tank and a compressed air valve interposing between the compressor and the expander, where the first and second rotors have a first end contacting a housing and the other end spaced apart from the inner surfaces of the housing, where the first and second hinged vanes have one end hinged to the housing and the other end contacting outer surfaces of the rotating rotor for operation, and a combustion chamber formed as an airtight space by a depressed surface of the housing of the expander and a surface of the hinged vane.

3 Claims, 5 Drawing Sheets

(56) References Cited

U.S. PATENT DOCUMENTS

| | | | |
|---|---|---|---|
| 4,876,850 A * | 10/1989 | Eickmann | 60/39.464 |
| 6,109,040 A * | 8/2000 | Ellison et al. | 62/6 |
| 2005/0284439 A1* | 12/2005 | Peitzke et al. | 123/221 |
| 2006/0196464 A1* | 9/2006 | Conners | 123/204 |
| 2008/0141973 A1* | 6/2008 | Shkolnik et al. | 123/234 |
| 2009/0308342 A1* | 12/2009 | Gerber | 123/18 A |
| 2010/0269782 A1* | 10/2010 | Minick et al. | 123/205 |
| 2011/0023814 A1* | 2/2011 | Shkolnik et al. | 123/210 |
| 2011/0259296 A1* | 10/2011 | Jacobsen et al. | 123/212 |
| 2012/0263617 A1* | 10/2012 | Tinney | 418/137 |

FOREIGN PATENT DOCUMENTS

| | | |
|---|---|---|
| JP | 60-022026 | 2/1985 |
| JP | 06-002559 A | 1/1994 |
| JP | 10-196385 A | 7/1998 |
| KR | 10-0892568 | 4/2009 |
| WO | 2008-016979 | 2/2008 |

\* cited by examiner

SEPARATE-TYPE ROTARY ENGINE

RELATED APPLICATIONS

This application is a 371 application of International Application No. PCT/KR2010/002782, filed May 1, 2010, which in turn claims priority from Korean Patent Application No. 10-2009-0039073, filed May 6, 2009, each of which is incorporated herein by reference in its entirety.

TECHNICAL FIELD

The present invention relates to a separate-type rotary engine which comprises a compressor and an expander respectively arranged in front of and in back of a rotary shaft 5 of a rotor. The compressor comprises a housing 1 which has a circular inner cross-sectional surface mostly and a groove formed in an upper portion thereof to accommodate therein a hinged vane 9, an air intake port 17 to inhale external air and a compressed air outlet 10 to supply air compressed by the compressor to a compressed air tank 12; a hinged vane 9 which has one end as a hinge point 20 within an upper portion of the housing 1 and the other end contacting an outer surface 4 of the rotor to reciprocatingly rotate, and is shaped like a blade that is completely accommodated by the groove of the hinged vane 9 of the housing 1 and does not interfere with a rotation of the rotor 3 when rotating to the maximum in a direction opposite to the center of the rotor 3; the rotor 3 which has a circular or elliptical shape or a combination of a circular and elliptical shape, and has one side line-contacting an inner surface 2 of the housing 1 from a rotor contacting point and the other side spaced apart from the inner surface 2 of the housing 1 using the center of the circular inner space of the housing 1 as an axis and has a cross-sectional surface without any sudden change; and side plates which secure the air-tightness of air from the sides of the housing 1, rotor 3 and hinged vane 9.

The expander comprises a housing 1' which comprises a circular inner cross-sectional surface, a combustion chamber space which is depressed from an upper portion thereof, a groove to accommodate therein a hinged vane 9', a combustion chamber passage to supply compressed air from the compressed air tank 12 to the combustion chamber 7 and a gas exhaust port 18 to discharge exhaust gas to the outside of the expander; a hinged vane 9' which has one side as a hinge point 20' within an upper portion of the housing 1' and the other side contacting an outer surface 4' of the rotor and reciprocatingly rotating centering on the hinge point 20', is completely accommodated by the groove of the hinged vane 9' of the housing 1' when rotating to the maximum in a direction opposite to the center of the rotor 3' not to interfere with a rotation of the rotor 3' and is shaped like a blade that shuts off the combustion chamber space from the inner space of the housing 1' to seal the combustion chamber 7; the rotor 3' which has a circular or elliptical shape or a combination of a circular and elliptical shape, and rotates with one side line-contacting an inner surface 2' of the housing 1' from the rotor contacting point 19 and the other side spaced apart from the inner surface 2' of the housing 1' using the center of the circular inner space of the housing as an axis and has a curved cross-sectional surface without any change; and side plates which secure air-tightness from the sides of the housing 1', rotor 3' and hinged vane 9'.

The separate-type rotary engine compresses air inhaled from a front end of an air intake space 6-1 of the compressor through the air intake port 17 at high-temperature and high-pressure to store the air in a compressed air tank 12 interposed between a one-way check valve 11 and a compressed air valve 12 through the compressed air outlet 10 installed in an end of a compression space 6-2, wherein the open/shut operation of the compressed air valve 13 is controlled in accordance with the rotation position of the expander rotor 3', opens the compressed air valve 13 and discharges the compressed air at a high speed to the combustion chamber 7 tightly shut by the hinged vane 9' when the rotor contacting point 19 contacting the expander rotor 3' and the housing 1' passes through the hinge point 20' of the upper portion of the inner space 2' of the housing and includes a fuel injecting device including a fuel controlling device 14 and a fuel nozzle 15 to inject fuel into the compressed air discharged at a high speed, and shuts down the compressed air valve 13 after the compressed air is completely discharged to the combustion chamber 7, and burns fuel mixed with air through the ignition device 16 provided at one side of the combustion chamber 7 to generate a force from the expander and discharges combustion gas from the end of the exhaust space 6-4 of the expander to the outside of the engine.

BACKGROUND ART

Wankel rotary engine is simple in configuration, light in weight per output and small in size and generates less vibrations and noise compared to a reciprocating engine. Nevertheless, the Wankel rotary engine is not widely used because a sealing between a triangular rotor eccentrically rotating around a central axis of the cylinder and the cylinder is not complete, a rotation interval at which the rotor absorbs force from combustion gas is short and has lower efficiency than an internal combustion engine and is less durable. As the rotor rotates eccentrically, a contacting angle between the sealing located at a vertex of the triangular rotor and the cylinder continues to change and the airtight sealing is not secured and the sealing effect is sharply reduced by a small wear of the sealing to thereby decrease efficiency.

As another type of a rotary engine different from the Wankel rotary engine, one of the oldest engines is the Hodson's patent rotary engine (Evan 6893) published in Evanion Catalogue of the British Museum. This steam engine (refer to FIG. 4) which is assumed to have been patented in 1884 includes a cylinder, a rotor which rotates using an inner central shaft of the cylinder as an axis, a hinged vane which has one side installed as a hinge in the cylinder and the other side contacting an outer surface of the rotor and reciprocatingly rotates centering on the hinge in accordance with the rotation of the rotor and a steam inducing device to generate the rotational force with respect to the rotor with the force of vapor pressure.

U.S. patent "combustion engine having fuel cut-off at idle speed and compressed air starting and method of operation (U.S. Pat. No. 4,741,164; Date of patent: May 3, 1988) is a rotary engine which is similar in basic shape to the patent engine of Hodson and has a check valve, a compressed air reservoir including an air valve storing excess compressed air and utilizes such compressed air when the engine starts, an air gate, a fuel supply device, and a firing chamber between a compressor module and a combustor module including a cylinder, rotor and an air chamber valve (or firing chamber valve), respectively. The air gate is open by a solenoid operating by a rotation position signal of the rotor and supplies compressed air to the firing chamber and is shut down by a pressure of combustion gas generated by combustion of the firing chamber.

Another U.S. patent rotary engine (U.S. Pat. No. 5,247,916) is similar to the rotary engine according to the present invention in that it includes a compression eccentric as a compressor and a power eccentric as an expander. However, unlike the rotary engine according to the present invention, this rotary engine includes a compression gate and a power gate which have one side fit into a cylinder slot and the other side contacting an outer surface of a rotor by a spring and go inside and come outside the slot when the rotor rotates.

PCT Patent hybrid cycle rotary engine (Patent application No. PCT/US2007/074980) has a compressor module and combustor module but uses a reciprocating rotation valve called rocker instead of a hinged vane. The rocker is closely adhered to the rotor which has one side rotating by an additional cam device or force of a spring.

DISCLOSURE

Technical Problem

The rotary engine (U.S. Pat. No. 5,247,916) and hybrid cycle rotary engine (patent application No. PCT/US2007/074980) which employ gate (or rocker) instead of hinged vane should push the gate (or rocker) to closely contact the outer surface of the gate through a spring and thus require a strong spring to maintain the contact with the rotor rotating at a high speed. To install such spring, a considerably large space is additionally required for the engine and thus increases the size of the engine.

U.S. Pat. No. 4,741,164 (May 3, 1988) engine is designed to supply air compressed by a compressor module to a combustor module through a gate valve and stores the excess compressed air in a compressed air reservoir including an air valve controlling outlet of air to use such air for starting the engine. With the foregoing configuration, the air compressed by the compressor module is not discharged from a cavity of the compressor module immediately before the gate valve is open. Thus, the pressure of the compressor rises sharply to be higher than air pressure required for a firing chamber and accordingly energy taken for rotating the rotor of the compressor is drastically large and deteriorates efficiency of the engine. Also, a rotational angle of the rotor of the compressor module and the combustor module should be precisely controlled so that the firing chamber of the combustor module is tightly shut by the firing chamber valve and receives the compressed air when the air is completely compressed by the compressor module.

The reciprocating engine uses a cam mechanism which moves together with the rotation of a crankshaft to open an air valve. U.S. Pat. No. 4,741,164 (May 3, 1988) is designed to open a gate valve through a solenoid to supply compressed air to a firing chamber. To provide enough time to supply the compressed air to the firing chamber, the gate valve should be open in a very short time after a signal is transmitted by a sensor of a rotor rotating angle, and thus the solenoid should react at a high speed to the signal. For example, in an engine rotating at 5,000 rpm, the solenoid should complete its operation within 0.00017 second to open the gate valve while the rotor rotates to 5 degrees after receiving a signal from the sensor of the rotor rotating angle. The solenoid should be large enough to open the gate valve shutting down the passage of the high compressed air with large force, in a very short time.

The rotary engine is very light in weight per output and small in size compared to the reciprocating engine, and is most suitable for aircraft engine. However, the rotary engine also has such characteristic as a general engine that deteriorates in output due to scarce air at high altitude. Thus, improvement is required to use the rotary engine for aircraft engine.

Technical Solution

The problem of the rotary engine (U.S. Pat. No. 5,247,916) and hybrid cycle rotary engine (patent application No. PCT/US2007/074980) employing the gate (or rocker) is solved by using the hinged vanes 9 and 9'. The hinged vanes 9 and 9' receive a force to closely contact the outer surfaces 4 and 4' of the rotor by compressed air and combustion gas and thus do not require an additional device such as a spring to be pushed to the outer surfaces 4 and 4' of the rotor. However, if the pressure of the compressed air and combustion gas is drastically reduced, i.e., if the rotor contacting point of the rotor 3 of the compressor is interposed between the hinge point 20 and the air intake port 17 and when the rotor contacting point 19 of the rotor 3' of the expander is interposed between the gas exhaust port 18 and hinge point 20', the pressure of the compressed air and combustion gas is low and thus the force pushing the hinged vanes 9 and 9' to the rotors 3 and 3' is weak and an additional device such as a spring may be needed. Even then, the compressor has yet to implement a full-scale expansion stroke and the expander has the hinged vane 9' pulled upward by a rotating rotor and starts to shut down the combustion chamber 7. Thus, operation or performance of the engine is not hurt even without any additional device such as a spring.

The engine deterioration problem arising from the configuration of the U.S. Pat. No. 4,741,164 (May 3, 1988) in which compressed air is directly supplied to a combustor module through a gate valve may be solved by installing the check valve 11 and compressed air tank 12 sequentially between the compressed air outlet 10 and compressed air valve 13 of the compressor. Then, the air compressed by the compressor is stored in the compressed air tank 12 through the check valve 11, and the air stored in the compressed air tank 12 is blocked by the check valve 11 allowing the flow of air only in one direction and thus the air cannot go back to the compressor and is supplied only to the combustion chamber 7 when the compressed air valve 13 is open. The compressed air tank 12 is one to three times larger in size than the combustion chamber 7 (the figure is an example and the size may vary) and does not sharply increase its pressure even if it receives all of the compressed air from the compressor, and thus prevents the pressure of the compression space 6-2 of the compressor from rising sharply. The rotor 3 of the compressor receives the rotational force from the expander through the rotor rotating shaft 5, but the compressor receives and compresses air through the air intake port 17 and stores such compressed air in the compressed air tank 12. The expander does not receive the compressed air as necessary directly from the compressor, but from the compressed air tank 12 storing therein compressed air. Thus, the rotors 3 and 3' of the compressor and expander are not needed to be precisely controlled at a consistent angle and installed.

U.S. Pat. No. 4,741,164 (May 3, 1988) opens the gate valve through a solenoid operating by an electrical signal to supply compressed air to the firing chamber. The solenoid should be large enough to open the gate valve blocking the high-pressure compressed air at a high speed. Supplementary devices generating a voltage, current and operating signal are required to operate the solenoid. The foregoing problem is solved if a valve using a cam device generally applying to a reciprocating engine for automobile or a two-way check valve 51 whose open/shut operation is controlled by moving together with the movement of the hinged vane 9 applies instead of the gate valve operating by the solenoid (refer to FIGS. 5 and 6). Particularly, the two-way check valve has a shape that two one-way check valves face each other and is shut down by a ball within the valve which blocks the outlet of one of opposite ends of a passage connected to the valve, wherein the outlet has a lower pressure in case there is a difference of pressure in the opposite ends. To open the outlet, the ball should be forcedly pushed by a valve stick 52 from the end having a lower pressure to the other end having a higher pressure. As shown in FIG. 6, when the hinged vane of the expander rotates by the rotor and starts to shut down the combustion chamber, the valve stick 52 pulled upward by the hinged vane pushes the ball of the two-way check valve 51 shut down by the compressed air and makes a passage to supply the compressed air to the combustion chamber (b and c in FIG. 6), and includes a fuel injecting device including a fuel controlling device and a fuel nozzle to inject fuel into the compressed air discharged at a high speed, and operate the ignition device within the combustion chamber and combusts the fuel in the combustion chamber at the moment when the valve stick 52 is pushed to the maximum (d in FIG. 6). If the pressure of the combustion gas within the combustion chamber rises to be higher than that of the compressed air tank, the ball of the two-way check valve 51 is pushed to the upper portion due to the difference of pressure and blocks the passage of the compressed air and blocks the introduction of the compressed air to the combustion chamber and prevents combustion gas from flowing back to the compressed air tank (d, e and f in FIG. 6). The rotor rotates and the hinged vane opens the combustion chamber to discharge most of combustion gas to the expansion space. If the pressure of the combustion chamber is lower than that of the compressed air tank, the compressed air pushes the ball of the two-way check valve 51 to the bottom and blocks the compressed air from being supplied to the combustion chamber which is open (a in FIG. 6).

To use the rotary engine as a more efficient aircraft engine, a variable compression rate compressor which has an open/shut air intake port in a rotor rotating direction in addition to the air intake port installed in the housing of the compressor applies (Refer to FIG. 8). When the open/shut additional air intake port 81 is open completely, the compressed air escapes from the additional air intake port until the rotor of the compressor passes by the additional air intake port and thus compression is not performed. Only after the rotor passes the additional air intake port, the compression is performed and thus the volume of the compressed air is reduced and the compression rate decreases (c in FIG. 9). If the additional air intake port is shut down completely, the maximum compression rate may be obtained (a in FIG. 9). If the additional air intake port is open completely, the minimum compression rate is obtained (c in FIG. 9). A proper compression rate may be obtained by the degree of opening and shutting down the additional air intake port (b in FIG. 9). Furthermore, when the additional air intake port is open completely, the force for compression is not required until the rotor passes through the additional air intake port. The application of the variable compression rate compressor may manufacture an engine whose performance is maximized under various conditions. For example, if the separate-type rotary engine according to the present invention is used as an aircraft engine, the additional air intake port is open to operate the engine at a low altitude with high air pressure. At a high altitude with scarce air, the additional air intake port is shut down to maintain a high compressed air pressure and improve engine performance.

BEST MODE

Hereinafter, an operation of a separate-type rotary engine according to an exemplary embodiment of the present invention will be described with reference to accompanying drawings.

Figure 1:
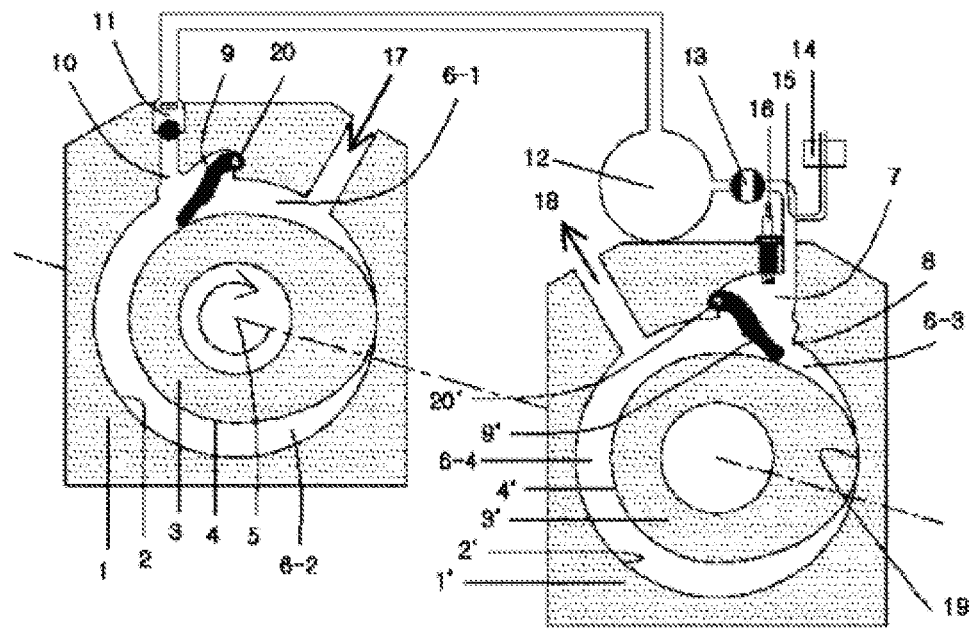
FIG. 1 is a representative drawing of the present invention which illustrates a separate-type rotary engine according to the present invention.
Figure 2:
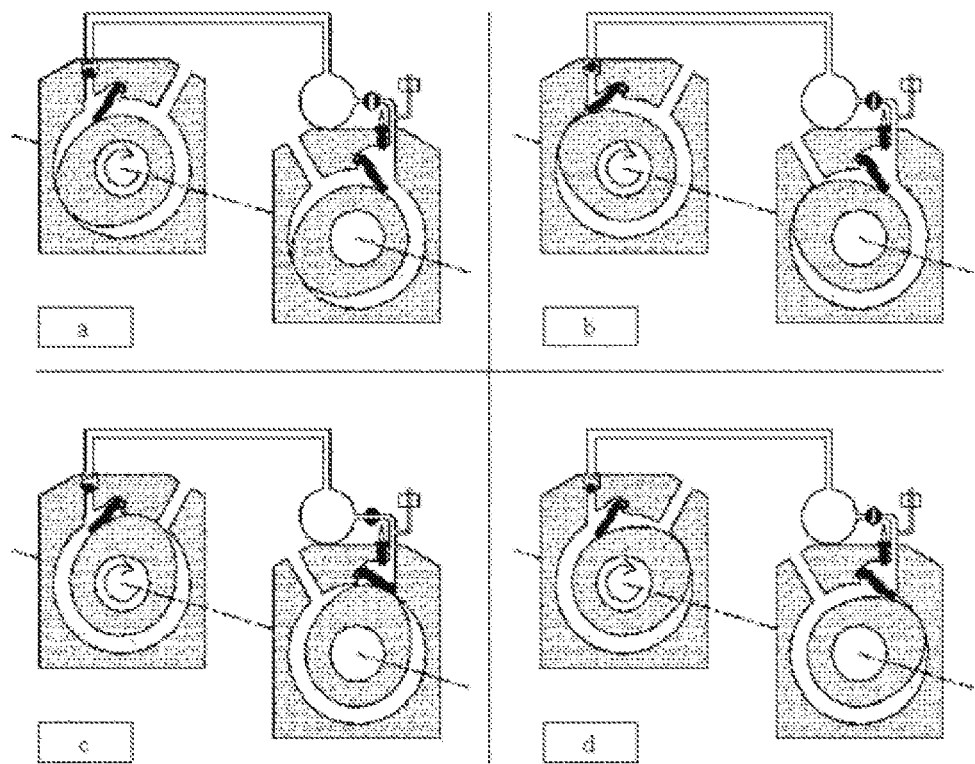
FIG. 2 illustrates an operation of engine parts according to a rotor rotating position in the separate-type rotary engine.

As shown in a and b in FIG. 2, a compressor compresses air inhaled by an air intake port 17 with a rotation of a rotor 3 and a hinged vane 9 and supplies the compressed air to a compressed air tank 12 through a compressed air outlet 10 and a compressed air check valve 11. An end of the hinged vane 9 closely contacts the rotor 3 by pressure of the compressed air to thereby maintain an air-tightness and prevents a loss of the pressure of the compressed air. The compressed air is prevented from flowing back to the compressor by the check valve and is stored in the compressed air tank 12 while the compressed air valve 13 is shut down.

When the rotor contacting point 19 contacting an inner surface 2' of the housing with the rotation of the rotor 3' of the expander passes the hinge point 20' on a top of the inner surface 2' of the housing, the hinged vane 9' which is pushed upwardly by the rotor 3' of the expander shuts down the inner surface 2' of the housing and forms an airtight combustion chamber 7. Concurrently, the compressed air valve 13 is open by a proper device and air from the compressed air tank 12 is rapidly introduced to the shut combustion chamber 7. Concurrently with the introduction of the compressed air, fuel is injected by a fuel nozzle 15 installed in a passage of the compressed air and is mixed with the compressed air to be introduced to the combustion chamber 7 (refer to c in FIG. 2). The fuel may be supplied by the fuel nozzle 15 provided in front/back of the compressed air valve 13, or mixed with air outside of the compressed and introduced to the compressor.

If the introduction of the compressed air and the fuel to the combustion chamber 7 is completed, the compressed air valve 13 is shut down and an ignition device 16 operates to perform combustion. Upon opening of the hinged vane 9' with the rotation of the rotor 3', high-temperature and high-pressure combustion gas is discharged from the combustion chamber outlet 8 and goes into an expansion space 6-3 to transmit a rotational force to the rotor 3' (refer to d in FIG. 2). The high-pressure combustion gas applies the force to the hinged vane 9', one end of which closely contacts an outer surface of the rotor 3' and maintains an air-tightness. The rotating rotor 3' pushes the exhaust gas remaining in the exhaust space 6-4 to the outside of the engine through the gas exhaust port 18, and rotates the rotor 3 of the compressor installed in the same rotor rotating shaft 5 to compress the air in the compression space 6-2.

Figure 3:
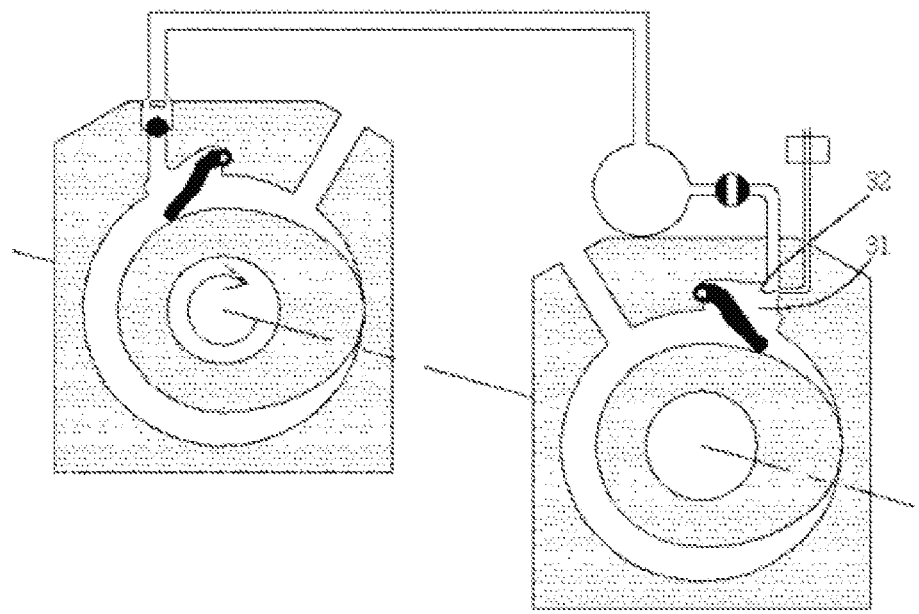
FIG. 3 is a compression ignition-type separate-type rotary engine which reduces a size of a combustion chamber to increase a pressure of the combustion chamber according to the present invention.
Figure 4:
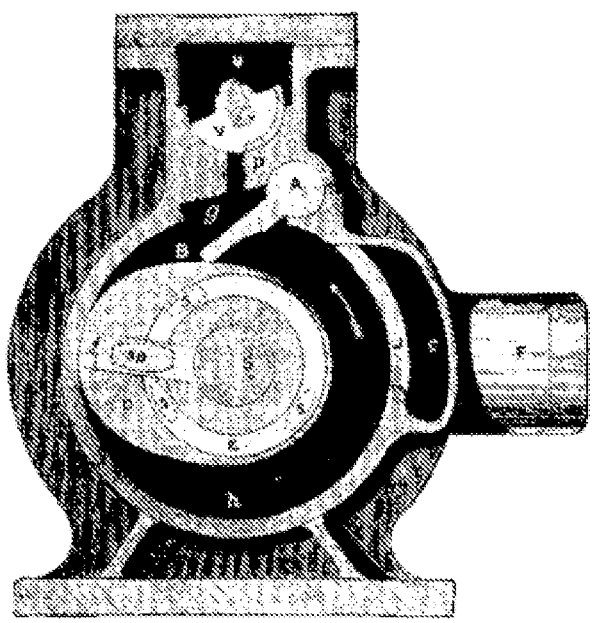
FIG. 4 illustrates Hodson's patent rotary engine (Evan 6893) published in Evanion Catalogue possessed by the British Museum.

To utilize the separate-type rotary engine as a compression ignition engine like a diesel engine, the size of the combustion chamber is reduced to raise a compression rate so that the air supplied by the compressor through the compressed air tank reaches a temperature to spontaneously ignite and burn a fuel supplied to the combustion chamber. In the case of diesel oil, the size of the combustion chamber should be determined to have a compression rate of 20 or more. However, as the compression rate for spontaneous ignition depends on the type of fuel, the size of the combustion chamber may vary by fuel. FIG. 3 illustrates a utilization of a compression ignition engine. A fuel injecting nozzle 32 which injects fuel is installed in a reduced combustion chamber 31 and the fuel is naturally ignited by high-temperature and high-pressure air of the reduced combustion chamber 31. Thus, the ignition device is not required.

Figure 5:
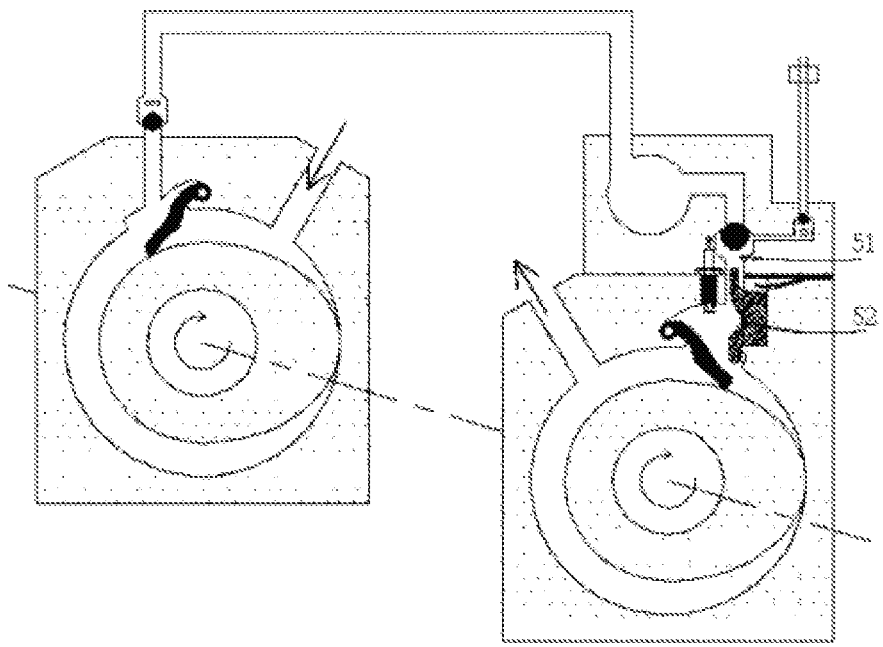
FIG. 5 illustrates a separate-type rotary engine which employs a two-way check valve.
Figure 6:
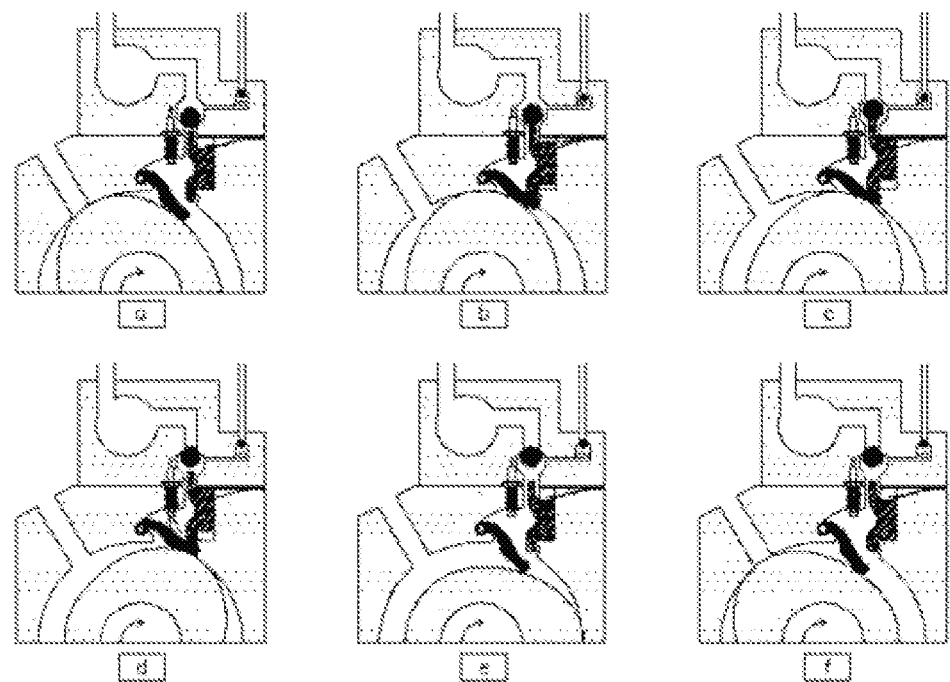
FIG. 6 illustrates an operation of the two-way check valve.

A two-way check valve 51 may be one of types of the compressed air valve 13 (refer to FIGS. 5 and 6). The compressor compresses air inhaled by the air intake port with the rotation of the rotor and the hinged vane and supplies the compressed air to the compressed air tank through the compressed air outlet and the compressed air check valve. The compressed air is prevented from flowing back to the compressor by the compressed air check valve and is stored in the compressed air tank while the two-way check valve 51 is shut down. Immediately before the rotor contacting point of the rotor of the expander reaches the hinge point on a top of the housing, the air pressure of the compressed air tank is higher than the pressure of the combustion chamber and the ball of the two-way check valve 51 blocks the passage to the combustion chamber to thereby block the flow of the compressed air.

b in FIG. 6 illustrates a supply of a fuel to the combustion chamber. That is, when the rotor contacting point passes the hinge point on a top of the housing and contacts the rotor of the expander, the hinged vane rotates and starts to shut down the combustion chamber. A valve stick 52 which is pushed upwardly by the hinged vane pushes the ball of the two-way check valve 51 shut down by the compressed air, and makes a passage for the compressed air of the compressed air tank to flow into the combustion chamber. Then, the compressed air is rapidly introduced to the shut combustion chamber and the fuel is supplied to the combustion chamber through the fuel nozzle installed in the air passage. The two-way check valve 51 has a closed configuration in which the ball blocks the outlet having a lower pressure when there is a difference of pressure between opposite ends of the path connected to the valve. To open the valve, the ball should forcedly be pushed by the valve stick 52 from the side having a lower pressure to the side having a higher pressure.

While the valve stick 52 is pushed upward to the maximum, the supply of the compressed air to the combustion chamber is completed (c in FIG. 6), and subsequently the ignition device within the combustion chamber operates and the combustion is performed in the combustion chamber (d in FIG. 6). Then, the pressure of the combustion gas within the combustion chamber sharply rises to be higher than the pressure of the compressed air tank. As a result of the difference of pressures, the ball of the two-way check valve 51 is completely pushed upwardly to block the passage of the compressed air to thereby prevent the combustion gas from flowing back to the compressed air tank. While the rotor rotates from the position in c in FIG. 6 to the position in d in FIG. 6, the volume of the combustion chamber is consistently maintained. Thus, if the ignition position is properly decided during the rotation, complete combustion is performed with the consistent volume. If the rotor contacting point passes the outlet of the combustion chamber, the hinged vane which contacts the outer surface of the rotor and rotates, rotates downwardly and the valve stick 52 also moves downwardly along with the hinged vane by the operation of the spring of the valve stick 52. As shown in e and f in FIG. 6, with the rotation of the rotor, the hinged vane opens the combustion chamber to discharge the combustion gas to the expansion space and decrease the pressure of the combustion chamber. However, the pressure of the combustion chamber is still higher than the pressure of the compressed air tank and the ball of the two-way check valve 51 blocks the passage of the compressed air. As shown a in FIG. 6, the rotor contacting point of the expander passes the gas exhaust port and the combustion gas generating the force from the expander is discharged to the outside of the engine through the gas exhaust port. In this case, the air pressure of the compressed air tank which is relatively higher pushes the ball of the two-way check valve 51 downwardly to block the air passage to the combustion chamber and the compressed air is not introduced to the combustion chamber.

Figure 7:
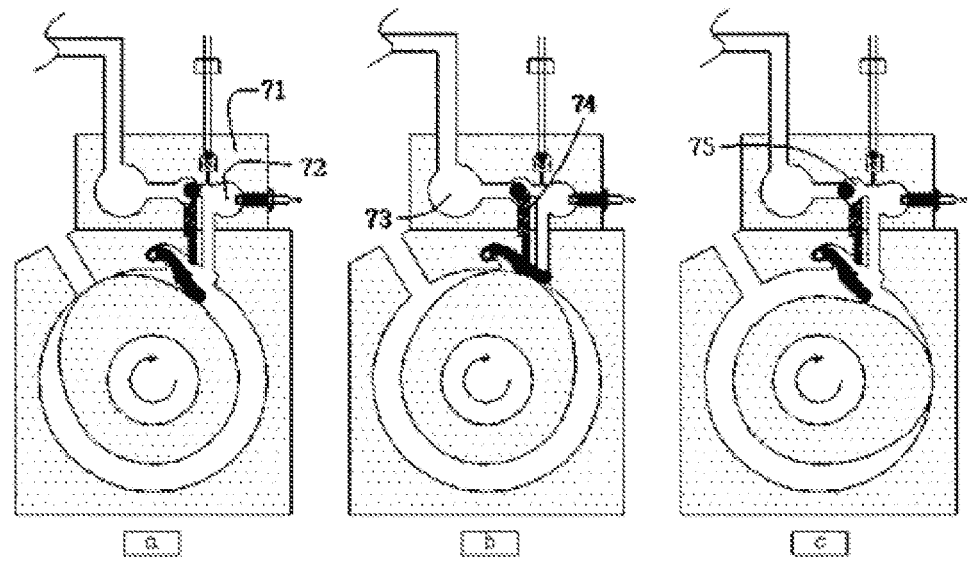
FIG. 7 illustrates another example of a separate-type rotary engine employing the two-way check valve.

As shown in FIG. 7, a two-way check valve 75 is installed horizontally and an end of a valve stick 74 is inclined. When the valve stick 74 is pushed upwardly by the hinged vane, the ball of the check valve is pushed horizontally by the inclined surface and opens the passage to the combustion chamber 72 within an upper housing 71 and the combustion chamber 72 is installed in the upper housing 71. In particular, the valve stick 74 is pushed downwardly always due to the pressure within the two-way check valve 75 applying to the inclined surface of the valve stick 74, and rotates at a high speed centering on the hinge point to form the combustion chamber by the hinged vane of the expander. If the valve stick 74 rotates and hits the housing of the expander, it applies a force in an opposite direction of the rotation of the hinged vane and reduces a shock.

Figure 8:
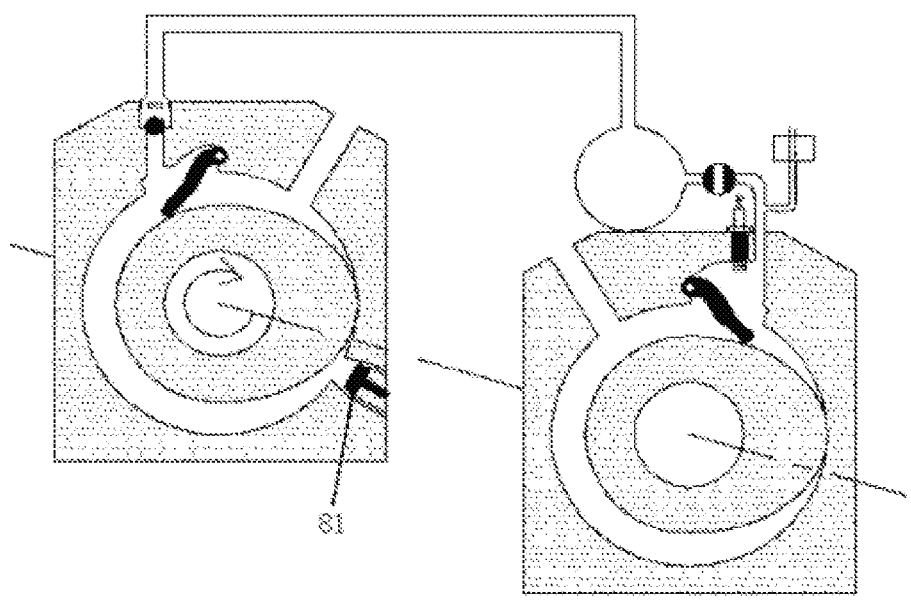
FIG. 8 illustrates a separate-type rotary engine which employs a variable compression rate compressor.
Figure 9:
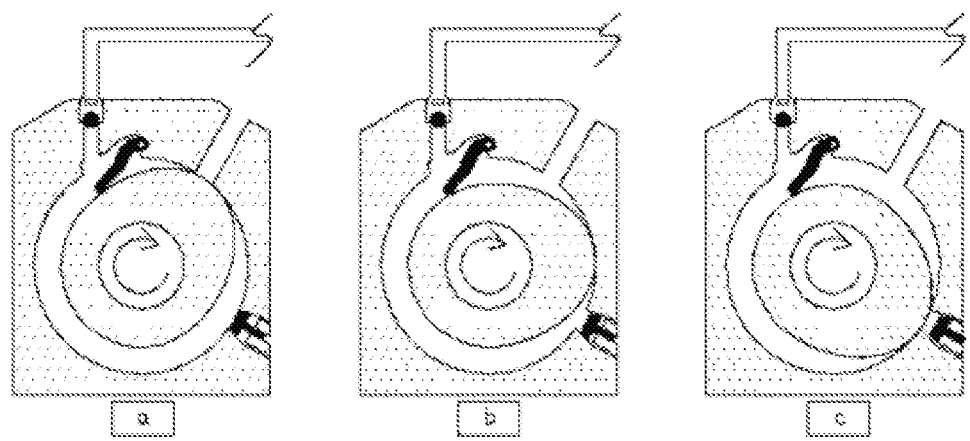
FIG. 9 illustrates the variable compression rate compressor.

To utilize the rotary engine as a more efficient aircraft engine, a variable compression rate compressor in which an open/shut air intake port is installed in a rotor rotating direction is installed, in addition to an air intake port 17 installed in the compressor housing (refer to FIG. 8). If the open/shut additional air intake port 81 is shut down completely, the maximum compression rate is obtained (a in FIG. 9). If the open/shut air intake port 81 is open completely, the minimum compression rate is obtained (c in FIG. 9). A proper compression rate may be obtained depending on the degree of opening and closing the air intake port 81. When the additional air intake port is open completely, the air compressed until the rotor passes the additional air intake port is leaked through the additional air intake port and the compression of air does not take place. As the rotor passes the additional air intake port, the compression starts to take place and the compressed air volume is reduced and the compression rate becomes lower. Until the rotor passes the additional air intake port, the force for the compression is not required. Application of a variable compression rate compressor may manufacture an engine whose performance may be maximized under various conditions. For example, if the separate-type rotary engine is used as an aircraft engine, the additional air intake port is open at a low altitude with high air pressure to operate the engine. At a high altitude with low air pressure, the additional air intake port is shut down to maintain a high compressed air pressure. This leads to a maximization of the engine performance.

As the hinged vanes 9 and 9' receive the force to closely contact the outer surfaces 4 and 4' of the rotor by the compressed air and combustion gas, an additional device such as a spring pushing the hinged vanes 9 and 9' to the outer surfaces 4 and 4' of the rotor is not required. However, at the moment when the pressure of the compressed air and combustion gas is sharply decreased, i.e., when the rotor contacting point of the rotor 3 of the compressor is interposed between the hinge point 20 and the air intake port 17 and the rotor contacting point 19 of the rotor 3' of the expander is interposed between the gas exhaust port 18 and the hinge point 20', an additional device may be required since the force pushing the hinged vanes 9 and 9' to the rotors 3 and 3' is weak. Even in this case, the compressor has yet to perform a full-scale expansion stroke. In the case of the expander, the hinged vane 9' is pushed upwardly by the rotating rotor 9' and starts to shut down the combustion chamber 7. Thus, even without the additional device such as a spring, operation or performance of the engine is not hurt.

The invention claimed is:

1. A rotary engine, comprising:
    a compressor having a first rotor, a first hinged vane, an air intake port, and an air outlet; and
    an expander having valve, a second rotor, a second hinged vane, an intake port for receiving air and fuel, a combustion chamber, and ignition device, and an exhaust port for discharging exhaust gases, and a valve stick,
    wherein a one-way check valve, a compressed air tank, a two-way check valve with a valve stick, and a fuel nozzle and a compressed air valve are interposed between the compressor and the expander,
    wherein the first rotor contacts a compressor housing having a first end contacting the compressor housing and another end spaced apart from inner surfaces of the compressor housing to rotate at a central axis of inner circular space of the compressor housing,
    wherein the second rotor contacts an expander housing having a first end contacting the expander housing and another end spaced apart from inner surfaces of the expander housing to rotate at a central axis of inner circular space of the expander housing,
    wherein the first and second rotors have at least one of a circular and elliptical shape,
    wherein the first hinged vane and the second hinged vane have one end hinged to the respective compressor housing and the respective expander housing and the other end contacting outer surfaces of the rotating first rotor and the rotating second rotor for operation, wherein the first hinged vane and the second hinged vane are formed in the shape of a blade and is are arranged closely to contact the respective first rotor and the respective second rotor by the difference of fluid pressure on both sides of the hinge vanes during compression and expansion process respectively,
    wherein a combustion chamber is formed as an airtight space by a depressed surface of the housing of the expander and a surface of the second hinged vane, the combustion chamber inhales air, said inhaled air passes via the air intake port in a front end of air intake space of the compressor is and compressed at a high pressure and stored in the compressed air-tank interposed between the one-way check valve and the two-way check valve through the compressed air outlet positioned at an end of the compression space,
    wherein a pressure difference between the compressor and compressed air tank open and close the one-way check valve, and wherein the intake port at the expander is closed by the two-way check when the fluid pressure difference between compressed air tank and combustion chamber exists,
    wherein the second hinged vane pushes the valve stick upwardly to open the two-way check valve for supplying the compressed air from the compressed air tank to the combustion chamber and simultaneously closes the combustion chamber,
    wherein compressed air from the compressed air tank and fuel from the fuel nozzle are supplied to the combustion chamber through the path formed by opened position of the two-way check valve, and wherein the ignition device starts combustion process in the combustion chamber, and
    wherein high pressure combustion gas in the combustion chamber pushes the two-way check valve further upward to close the intake port of the expander to prevent the combustion gas flowing back to the compressed air tank,
    wherein the second hinged vane opens as the second rotor rotates and the high pressure combustion gas in the combustion chamber discharges to the expander to push the second rotor to rotate until the second rotor passes the exhaust port, and
    wherein the two-way check valve moves down to close the intake port preventing the fresh air in the compressed air tank from being wasted to expander while the second hinged vane is opened and the combustion chamber pressure is lower than the compressed air tank pressure.

2. The rotary engine according to claim 1, wherein the combustion chamber comprises a fuel injecting nozzle positioned at the intake port of the expander and a reduced combustion chamber is formed by the second rotor as being rotating to reduce a volume of the chamber to form a compression rate at which the air supplied by the compressor through the compressed air tank rises to a temperature to ignite and combust fuel directly injected by the fuel injecting nozzle to the combustion chamber.

3. The rotary engine according to claim 1, further comprising:
    an open/shut air intake port positioned in the compressor housing to obtain appropriate compression rate in the compressor in a rotational direction of the first rotor,
    wherein the open/shut air intake port forms a variable compression rate by escaping the air through the air intake port, and compression is not performed until the first rotor passes the open/shut air intake port, and the air intake port opens after the first rotor passes the open/shut air intake port and has the compressed air volume reduced thereby lowering the compression rate.

* * * * *